US011697506B2

(12) United States Patent
Schelfaut et al.

(10) Patent No.: US 11,697,506 B2
(45) Date of Patent: Jul. 11, 2023

(54) METHODS AND APPARATUS FOR GAS TURBINE BENDING ISOLATION

(71) Applicant: General Electric Company, Schenectady, NY (US)

(72) Inventors: Timothy Leo Schelfaut, Lebanon, OH (US); Thomas P. Joseph, West Chester, OH (US); Jonathan E. Coleman, Mason, OH (US); Anthony M. Metz, Harrison, OH (US); Stefan K. Fox, Symmes Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 247 days.

(21) Appl. No.: 16/875,662

(22) Filed: May 15, 2020

(65) Prior Publication Data

US 2021/0354838 A1    Nov. 18, 2021

(51) Int. Cl.
  *B64D 27/26*    (2006.01)
  *F02K 3/06*    (2006.01)
  *F02C 7/36*    (2006.01)

(52) U.S. Cl.
  CPC ............... *B64D 27/26* (2013.01); *F02K 3/06* (2013.01); *B64D 2027/266* (2013.01); *B64D 2027/268* (2013.01); *F02C 7/36* (2013.01); *F05D 2220/323* (2013.01); *F05D 2220/36* (2013.01); *F05D 2230/60* (2013.01); *F05D 2240/60* (2013.01); *F16C 2360/23* (2013.01)

(58) Field of Classification Search
  CPC .............. B64D 27/26; B64D 2027/262; B64D 2027/266; B64D 2027/268; B64D 29/06; F02C 7/20
  See application file for complete search history.

(56) References Cited

U.S. PATENT DOCUMENTS

| | | | | |
|---|---|---|---|---|
| 3,006,587 | A | * | 10/1961 | Morel ................. F16C 11/0614 248/554 |
| 4,346,861 | A | | 8/1982 | Legrand et al. |
| 4,603,822 | A | | 8/1986 | Chee |
| 5,174,525 | A | * | 12/1992 | Schilling .................... F02C 7/20 60/797 |
| 5,823,470 | A | * | 10/1998 | Craig .................. B64C 29/0033 74/665 GA |
| 5,860,276 | A | | 1/1999 | Newton |
| 6,327,846 | B1 | | 12/2001 | Feder et al. |

(Continued)

FOREIGN PATENT DOCUMENTS

| | | |
|---|---|---|
| CN | 110546369 A | 12/2019 |
| EP | 1046806 A1 | 10/2000 |

*Primary Examiner* — Alain Chau
(74) *Attorney, Agent, or Firm* — Hanley, Flight & Zimmerman, LLC

(57) ABSTRACT

Methods, apparatus, systems and articles of manufacture are disclosed to methods and apparatus for gas turbine bending isolation. An example mechanical interface to couple a first section of a gas turbine to a second section of the gas turbine, the mechanical interface comprising a first mating surface disposed on the first section, and a second mating surface disposed on the second section and circumferentially around the first mating surface, wherein the coupling of the first mating surface to the second mating surface enables the first section to rotate about the mechanical interface during operation of the gas turbine.

15 Claims, 12 Drawing Sheets

(56) References Cited

U.S. PATENT DOCUMENTS

| | | | |
|---|---|---|---|
| 6,682,015 B2 | 1/2004 | Levert et al. | |
| 6,976,655 B2* | 12/2005 | Thompson | F02C 7/20 |
| | | | 244/54 |
| 8,152,094 B2 | 4/2012 | Foster | |
| 8,443,612 B2 | 5/2013 | Foster | |
| 8,469,309 B2 | 6/2013 | Stuart et al. | |
| 8,534,597 B2* | 9/2013 | Baillard | B64D 27/26 |
| | | | 244/54 |
| 9,394,057 B2* | 7/2016 | Guillou | B64D 27/26 |
| 9,527,598 B2 | 12/2016 | Whiteford et al. | |
| 9,701,412 B2 | 7/2017 | Stretton et al. | |
| 9,868,542 B2* | 1/2018 | Williams | B64C 3/32 |
| 9,963,999 B2* | 5/2018 | Belief | B64D 27/16 |
| 10,029,801 B2 | 7/2018 | Butcher et al. | |
| 10,029,802 B2* | 7/2018 | Williams | B64D 27/26 |
| 10,060,354 B2 | 8/2018 | Suciu et al. | |
| 10,184,401 B2* | 1/2019 | Bellabal | F02C 7/20 |
| 10,190,501 B2* | 1/2019 | Bagnall | F02C 3/04 |
| 11,421,627 B2 | 8/2022 | Moniz et al. | |
| 2004/0108413 A1* | 6/2004 | Thompson | F02C 7/20 |
| | | | 244/54 |
| 2005/0016158 A1 | 1/2005 | Berdoyes et al. | |
| 2010/0155525 A1* | 6/2010 | Stuart | B64D 27/26 |
| | | | 244/54 |
| 2010/0206981 A1* | 8/2010 | Baillard | B64D 27/26 |
| | | | 244/54 |
| 2011/0308257 A1* | 12/2011 | Vauchel | B64D 27/26 |
| | | | 60/796 |
| 2013/0074517 A1* | 3/2013 | Suciu | B64D 27/26 |
| | | | 60/797 |
| 2013/0233997 A1 | 9/2013 | Suciu et al. | |
| 2015/0175268 A1* | 6/2015 | Guillou | B64D 27/26 |
| | | | 244/54 |
| 2016/0108817 A1* | 4/2016 | Bagnall | F02C 3/04 |
| | | | 60/796 |
| 2017/0101895 A1* | 4/2017 | Bellet | B64D 29/02 |
| 2017/0305566 A1* | 10/2017 | Williams | F16H 57/021 |
| 2018/0099758 A1* | 4/2018 | Williams | F16H 57/021 |
| 2018/0118358 A1 | 5/2018 | Hellegouarch et al. | |
| 2020/0102081 A1 | 4/2020 | Tulloch et al. | |

* cited by examiner

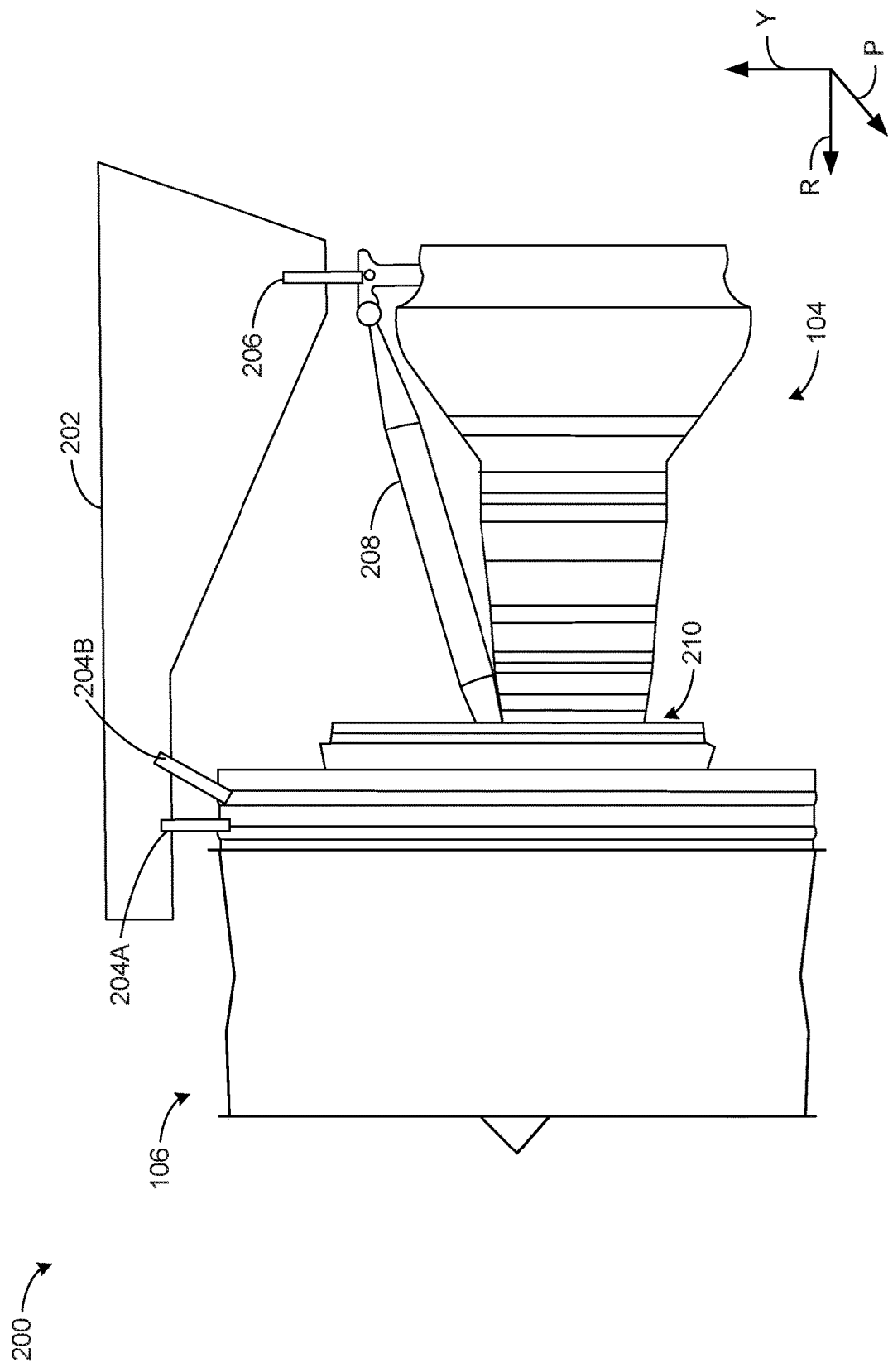

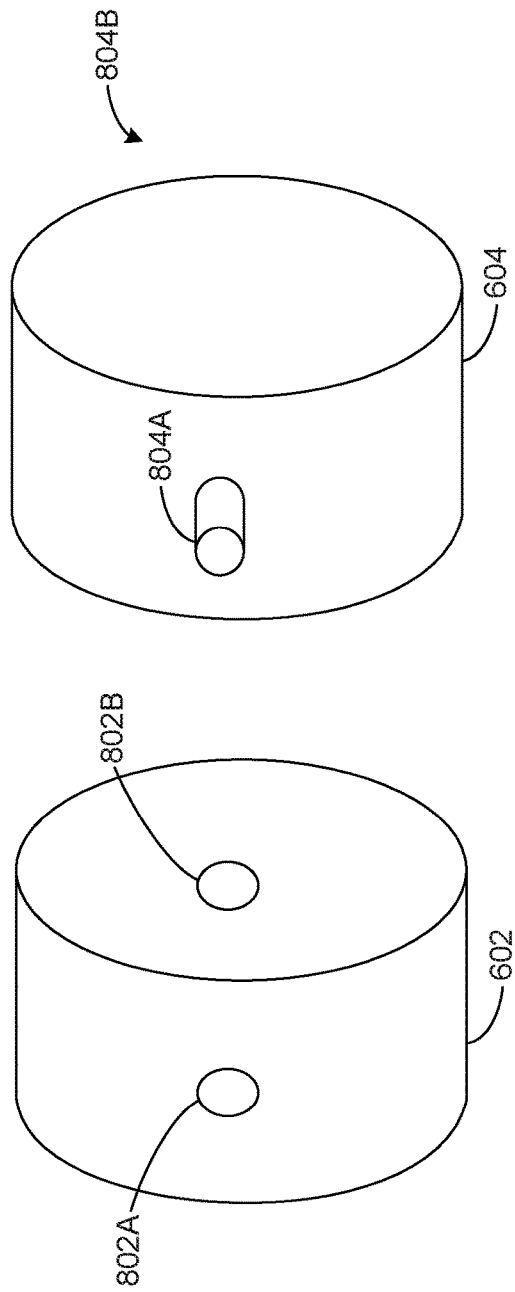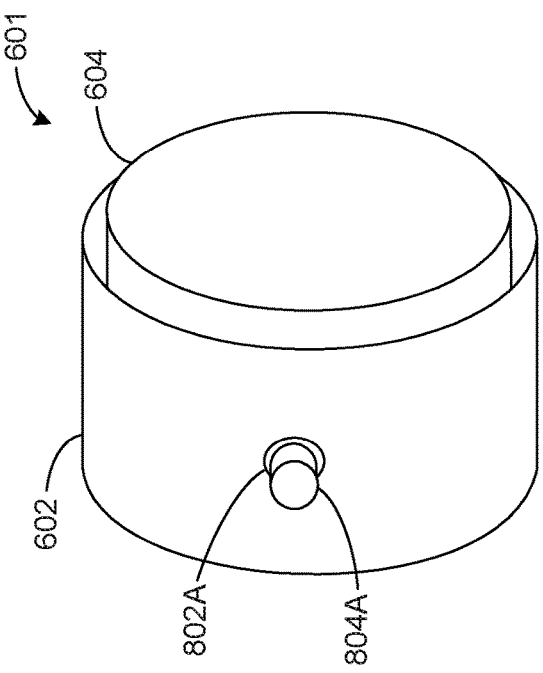

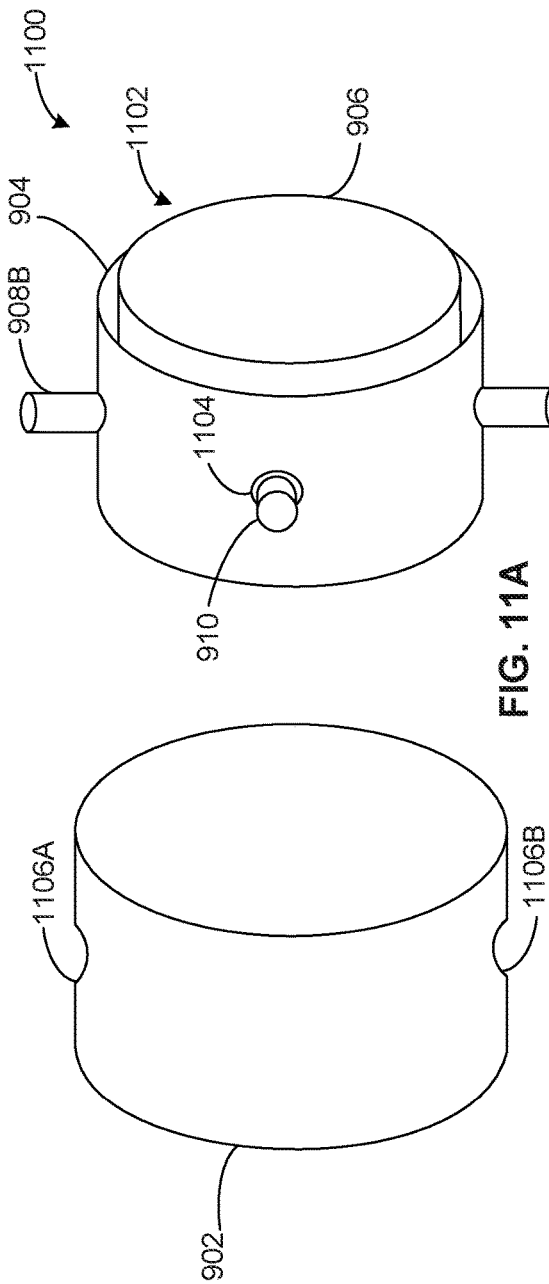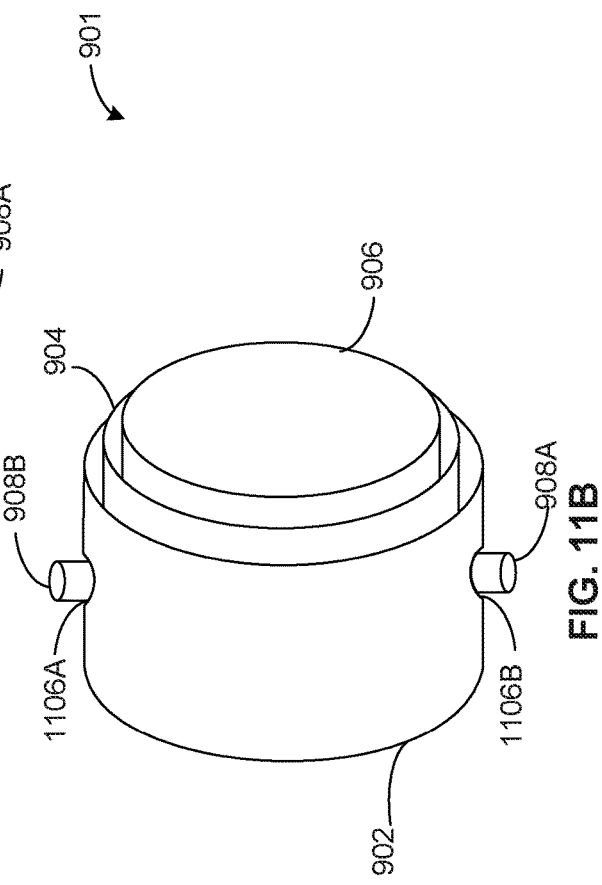

METHODS AND APPARATUS FOR GAS TURBINE BENDING ISOLATION

FIELD OF THE DISCLOSURE

This disclosure relates generally to gas turbines, and, more particularly, to methods and apparatus for gas turbine bending isolation.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

A gas turbine engine produces a thrust that propels a vehicle forward, e.g., a passenger aircraft. The thrust from the engine transmits loads to a wing mount, e.g., a pylon, and likewise the wing mount applies to the engine equal and opposite reaction forces, which results in a bending moment applied to the engine casing. It is desirable to reduce this bending moment.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 2A is a side view of a gas turbine engine mounted to an aircraft including a mechanical interface between the fan section of the gas turbine engine and the core section of the gas turbine engine;

FIGS. 8A-8B is an illustration of the pinned joint of FIGS. 5-6;

FIGS. 11A-11B is an illustration of the pinned joint of FIGS. 9-10.

Figure 1:
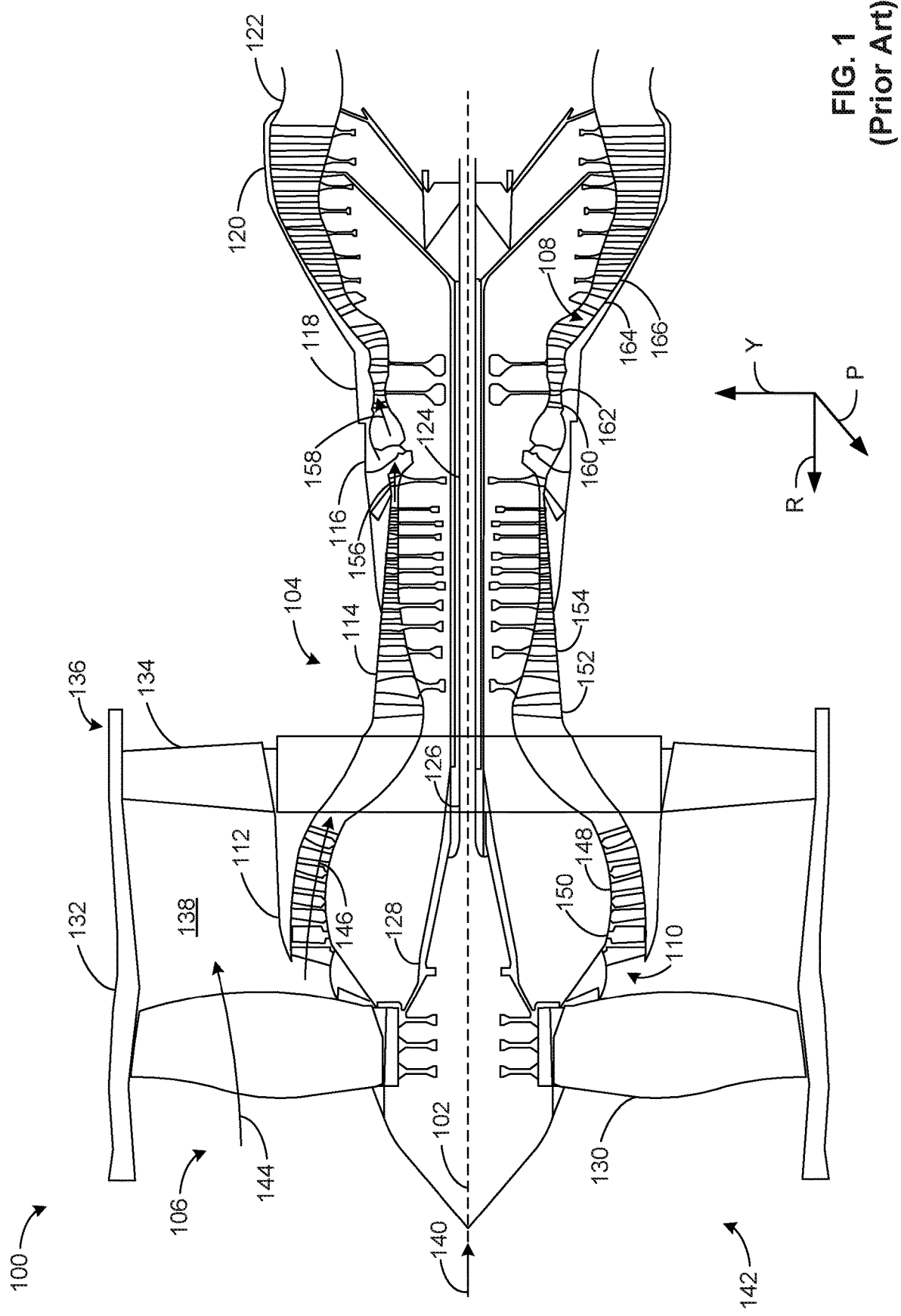
FIG. 1 is a schematic cross-sectional view of a prior-art gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., section, linkage, area, region, or plate, etc.) is in any way on (e.g., positioned on, located on, disposed on, disposed about, or formed on, etc.) another part, indicates that the referenced part is either in contact with the other part, or that the referenced part is above the other part with one or more intermediate part(s) located therebetween. Connection references (e.g., attached, coupled, mated, connected, joined, etc.) are to be construed broadly and may include intermediate members between a collection of elements and relative movement between elements unless otherwise indicated. Some parts and/or features can include "mating surfaces," which is defined below in the detailed description. As such, connection references do not necessarily infer that two elements are directly connected and in fixed relation to each other. Stating that any part is in "contact" with another part means that there is no intermediate part between the two parts.

BRIEF SUMMARY

Aspects and advantages of the invention will be set forth in part in the following description, or may be obvious from the description, or may be learned through practice of the invention. In one aspect, the present disclosure is directed towards A mechanical interface to couple a first section of a gas turbine to a second section of the gas turbine, the mechanical interface comprising a first mating surface disposed on the first section and a second mating surface disposed on the second section and circumferentially around the first mating surface, wherein the coupling of the first mating surface to the second mating surface enables the first section to rotate about the mechanical interface during operation of the gas turbine.

A further aspect of the disclosure is directed towards a gas turbine engine, comprising a first section including a fan section, a second section including at least one of a high pressure compressor, a low pressure turbine, or a high pressure turbine and a mechanical interface between the first section and the second section, the mechanical interface enabling the first section to rotate about the second section while retaining the gas turbine engine to a vehicle mount during operation of the engine.

A further aspect of the disclosure is directed towards an apparatus comprising a gas turbine engine having a first section and a second section and means for coupling the first section to the second section, the coupling means enabling the first section to rotate about the second section and retain the engine to a vehicle mount during operation of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION

Compressor blade tip clearances in gas turbine engines are reduced by operational distortions caused by internal forces of the gas turbine engines. Particularly, thrust and aero inlet loads can create an internal bending moment in the gas turbine engine, which causes the gas turbine engine to bend between the mounting linkages of the gas turbine engine. Certain examples disclosed herein provide a mechanical interface (e.g., a spherical bearing, a pinned joint, etc.) that decouple the fan section and the core section to reduce operational distortions caused by bending moments transferred therebetween.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with a set of axes including the yaw axis Y, the roll axis R, and the pitch axis P. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Cold blade tip clearances (e.g., blade tip clearances when the engine is not in operation) and the resulting operating clearances in the compressor and/or fan are often defined (e.g., pinched, designed, etc.) based on clearance closures during take-off (TO) rotation maneuvers (e.g., TO rotation maneuvers are the clearance pinch point for several locations/engine stages throughout the engine, etc.). That is, in some examples, the minimum blade tip clearances (e.g., closest clearances, etc.) in the fan, the compressor, the low-pressure turbine and/or the high-pressure turbine occur during TO engine operation. As such, the minimum blade tip clearance the engine can operate at during take-off is based on the clearance reduction caused by engine vibrations, the TO rotation pinch point (e.g., 2-dimensional average clearance closures, etc.), axisymmetric closures caused by temperature variations in the engine, and the distortion (e.g., strain, etc.) caused by operation of the engine. Operational distortion in an engine can be caused by internal forces in the engine from thrust and/or aero inlet loads. The engine body can bend between the forward and aft mount attachment point of engine to the aircraft. Designing to compensate for the distortions reduces the minimum blade clearance and thereby the engine efficiency (e.g., specific fuel consumption, etc.).

Examples disclosed herein negate these distortions by coupling the core section and the fan section with a mechanical interface that prevents bending moments from being transferred therebetween. In some examples disclosed herein, a mechanical interface decouples the core section from the fan section in rotation about the roll axis, yaw axis, and pitch axis. In some examples disclosed herein, the mechanical interface eliminates the bending moments caused by engine operation during take-off. In some examples disclosed herein, the mechanical interface is a spherical bearing disposed about the circumference of the fan section and core section. In some examples disclosed herein, the mechanical interface is a pinned joint disposed about the circumference of the fan section and core section. In some examples disclosed herein, the pinned joint includes an intermediate ring disposed between a mating surface of the turbine and a mating surface of the fan section.

As used herein "a mating surface" is a surface of a part in contact with another part during assembly that constrains some or all of the translation and/or rotation of the parts relative to one another. Mating surfaces include flanges, the surface(s) of a bearing, etc. Mating surfaces can be coupled together directly (e.g., via one or more welds, one or more fasteners, one or more retaining features, via a press fit, etc.) or indirectly via other features and/or parts in the assembly (e.g., one or more pins, one or more retaining features, etc.).

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 includes a core section 104 disposed downstream from a fan section 106.

The core section 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration).

As shown in FIG. 1, the fan section 106 includes a plurality of fan blades 130 coupled to and extending radially outwardly from the fan shaft 128. An annular fan casing or nacelle 132 circumferentially encloses the fan section 106 and/or at least a portion of the core section 104. The nacelle 132 is supported relative to the core section 104 by a plurality of circumferentially-spaced apart outlet guide vanes 134. Furthermore, a downstream section 136 of the nacelle 132 can enclose an outer portion of the core section 104 to define a bypass airflow passage 138 therebetween.

As illustrated in FIG. 1, air 140 enters an inlet portion 142 of the turbofan 100 during operation thereof. A first portion 144 of the air 140 flows into the bypass flow passage 138, while a second portion 146 of the air 140 flows into the inlet 110 of the LP compressor 112. One or more sequential stages of LP compressor stator vanes 148 and LP compressor rotor blades 150 coupled to the LP shaft 126 progressively compress the second portion 146 of the air 140 flowing through the LP compressor 112 en route to the HP compressor 114. Next, one or more sequential stages of HP compressor stator vanes 152 and HP compressor rotor blades 154 coupled to the HP shaft 124 further compress the second portion 146 of the air 140 flowing through the HP compressor 114. This provides compressed air 156 to the combustion section 116 where it mixes with fuel and burns to provide combustion gases 158.

The combustion gases 158 flow through the HP turbine 118 in which one or more sequential stages of HP turbine stator vanes 160 and HP turbine rotor blades 162 coupled to the HP shaft 124 extract a first portion of kinetic and/or thermal energy from the combustion gases 158. This energy extraction supports operation of the HP compressor 114. The combustion gases 158 then flow through the LP turbine 120 where one or more sequential stages of LP turbine stator vanes 164 and LP turbine rotor blades 166 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 158 then exit the core section 104 through the exhaust section 122 thereof.

The following examples refer to a gas turbine engine, similar to the engine described with reference to FIG. 1, except that the engine is modified for mounting to a strut, such as a wing pylon, and includes a mechanical interface to prevent bending moments from being transmitted between the fan section and core section, in accordance with this disclosure. When the same element number is used in connection with FIGS. 2A-9 as was used in FIG. 1, it has the same meaning unless indicated otherwise.

FIG. 2A is a side view of a gas turbine engine 200 modified for mounting to a strut 202, such as a wing pylon. The gas turbine engine 200 is mounted to the strut 202 via a first forward mount 204A, a second forward mount 204B, and an aft mount 206. In FIG. 2A, the gas turbine engine 200 includes a thrust linkage 208. The fan section 106 is coupled to the core section 104 via a spherical bearing 210 that prevents bending moments from being transferred between the fan section 106 and the core section 104.

The gas turbine engine 200 of FIG. 2A is wing-mounted. The gas turbine engine 200, shown and described in detail in FIG. 2A, is a turbofan. In other examples, the gas turbine engine 200 can be another type of gas turbine engine (e.g., turboprop, turbojet, etc.). The gas turbine engine of FIG. 2A is a two-spool engine. In other examples, the gas turbine engine 200 includes another number of spools (e.g., one spool, three spools, etc.) and an associated number of corresponding sections. In some examples, the gas turbine engine 200 can include components not depicted in FIG. 2A (e.g., an afterburner, etc.). The gas turbine engine 200 of FIG. 2A is an axial flow engine. While examples disclosed herein are described with reference to a gas turbine mounted to a wing, the teachings of this disclosure should not be limited exclusive to wing-mounted gas turbine engines. Instead, the teachings of this disclosure can be applied to other gas turbine and/or internal combustion engine(s).

The first forward mount 204A, the second forward mount 204B, and the aft mount 206 transfer the forces associated with the gas turbine engine 200 to the strut 202. The mounts 204A, 204B, 206 react the weight, thrust, and aerodynamic and related engine forces generated during aircraft operations. The operation of the gas turbine engine produces forces and/or bending moments that, when reacted by the mounts 204A, 204B, 206 exert corresponding equilibrium forces on the engine. The operation of the gas turbine engine 200 can cause axial forces, yaw-axis forces, pitch-axis forces, and/or bending moments to be exerted between the core section 104 and the fan section 106. The fan section 106 is additionally coupled to the aft mount 206 via the thrust linkage 208. In combination, the first forward mount 204A, the second forward mount 204B, the aft mount 206 and thrust linkage 208 constrain the six degrees of freedom of the gas turbine engine (e.g., vertical translation, lateral translation, axial translation, rotation about the yaw axis, rotation about the pitch axis, and rotation about the roll axis).

The forward mounts 204A, 204B constrain the movement of the fan section 106. The first forward mount 204A can be implemented by three linkages. In other examples, the first forward mount 204A can be implemented by a 2-pin swing linkage and/or a 3-pin fixed linkage with any of various shapes (e.g., a boomerang linkage, a triangle linkage, a straight linkage with a center pin, etc.). In such examples, the first forward mount 204A constrains the three translational degrees of freedom (e.g., vertical translation, lateral translation, axial translation, etc.) of the fan section 106. In other configurations of the forward mounts 204A, 204B and the thrust linkage 208, the first forward mount 204A can constrain different degrees of freedom (e.g., vertical translation and lateral translation, etc.). The second forward mount 204B is one or more axial link(s) that constrain rotation about the pitch axis. Additionally or alternatively, the second forward mount 204B can constrain rotation about the yaw axis alone or in combination with the first forward mount 204A. In other examples, the first forward mount 204A and/or second forward mount 204B can be implemented by another combination of linkages such as one or more pivot linkages, one or more ball linkages, etc.

In FIG. 2A, the thrust linkage 208 constrains the rotation of the fan section 106 about the roll axis. Additionally or alternatively, depending on the configuration of the forward mounts 204A, 204B and the thrust linkage 208, the thrust linkage can react the axial load and/or the yaw moment. The forward mounts 204A, 204B and the thrust linkage 208 constrain all six degrees of freedom of the fan section 106 to prevent the fan section 106 from translating and/or rotating relative to a strut 202.

In an alternative example, the engine 200 is an open-rotor gas turbine engine, which does not include a fan casing 132. In this example, the forward mounts 204A, 204B connect directly to the engine body at a location forward of the compressor 114 (e.g., forward of the pivot, bearing or linkage described infra, etc.) and aft of the struts or guide vanes 134.

The aft mount 206 constrains the three rotational degrees of freedom of the core section 104 (e.g., constrains rotation about the yaw axis, constrains rotation about the pitch axis, constrains rotation about the roll axis, etc.). In some examples, the aft mount 206 is implemented by three linkages (e.g., three links, etc.). In other examples, the aft mount 206 is implemented by a 2-pin swing linkage and/or a 3-pin fixed linkage with any of various shapes (e.g., a boomerang linkage, a triangle linkage, a straight linkage with a center pin, etc.). The remaining degrees of freedom of the core section 104 are constrained by the coupling of the core section 104 to the fan section 106. That is, the spherical bearing 210 constrains the translational degrees of freedom (e.g., vertical translation, lateral translation, and axial translation degrees of freedom, etc.).

The spherical bearing 210 is a mechanical interface that couples the fan section 106 to the core section 104. The spherical bearing 210 decouples the fan section 106 from the core section 104 in rotation about the roll axis, pitch axis, and yaw axis. In such examples, the spherical bearing 210 reacts the translational forces transmitted between fan section 106 and the core section 104. The spherical bearing 210 enables the fan section 106 and the core section 104 to rotate relative to one another during the operation of the gas turbine engine 200 (e.g., rotate about the pitch axis, rotate about the yaw axis, rotate about the roll axis, etc.). That is, the spherical bearing 210 does not transmit bending moments between the fan section 106 and the core section 104. In FIG. 2A, the spherical bearing 210 is disposed between the fan section 106 and the core section 104. Additionally or alternatively, the spherical bearing 210 can be disposed at another location in the gas turbine engine 200 (e.g., downstream between the HP compressor 114 and the combustion section 116, downstream between the combustion section 116 and the HP turbine 118 etc.). In other examples, the spherical bearing 210 is implemented by another type of bearing (e.g., a ball bearing, a cylindrical bearing, a gear bearing, etc.).

In FIG. 2A, the spherical bearing 210 prevents and/or reduces strain and/or deflections caused by the reaction of bending moments between the fan section 106 and the core section 104 from occurring in the fan section 106 and/or core section 104. The reduction/prevention of bending moment induced strains and/or deflections enables tighter operational tip clearances between the blades of the rotors and the engine casing. The improved operational tip clearances improve engine efficiency, engine operability, and fuel consumption (e.g., reduce specific fuel consumption (SFC), etc.).

Figure 2B:
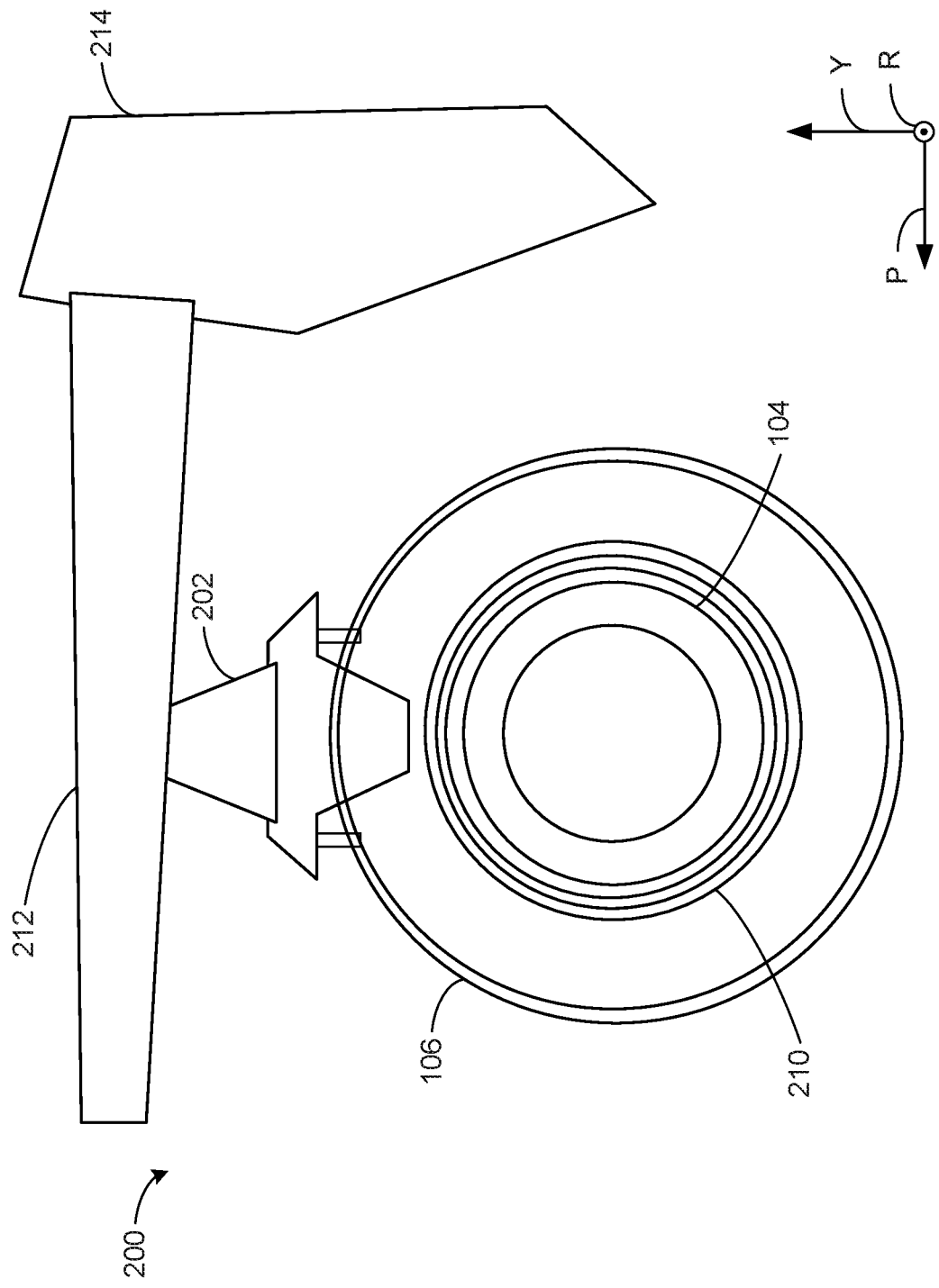
FIG. 2B is a front view of the gas turbine engine of FIG. 2A mounted to an aircraft.

FIG. 2B is a front view of the gas turbine engine 200 of FIG. 2A. The strut 202 is coupled to a wing 212. The wing 212 is coupled to a fuselage 214 of an aircraft. The gas turbine engine 200 is a wing-mounted engine. In other examples, the gas turbine engine is coupled at another location on the aircraft (e.g., fuselage-mounted, tail-mounted, etc.).

Figure 3:
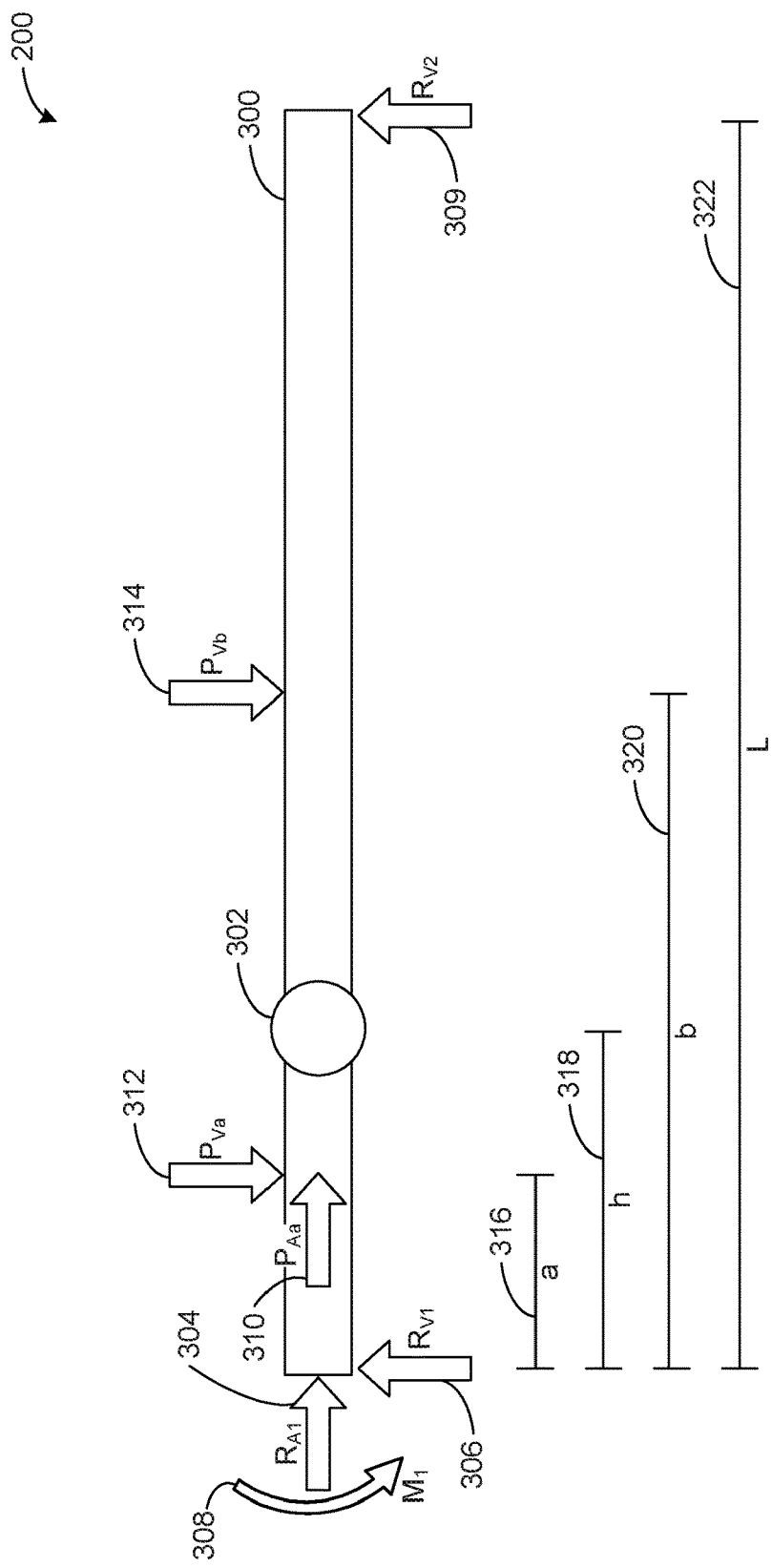
FIG. 3 is a free body diagram for the gas turbine engine of FIGS. 2A and 2B, illustrating equilibrating forces and moments acting on the engine.

FIG. 3 is a free body diagram of the gas turbine engine 200 of FIGS. 2A-2B when subjected to operational loads. The carcass of the gas turbine engine 200 has been modeled as a beam 300 with an internal hinge 302, which corresponds to the spherical bearing 210. The beam 300 is fixed at the left-side (e.g., via the forward mounts 204A, 204B, the thrust linkage 208, etc.) which exerts a first reactionary force 304, a second reactionary force 306, and a reactionary moment 308 on the beam 300. The beam 300 is additionally reacted by a third reactionary force 309 on the right end of the beam 300. The beam 300 is additionally subjected to an axial load 310 and a first vertical load 312 to the left of the hinge 302 and a second vertical load 314 to the right of the hinge 302. The axial load 310 and the first vertical load 312 are applied at a first distance 316 from the right side of the beam 300. The hinge 302 is a second distance 318 from the right side of the beam 300. The second vertical load 314 is a third distance 320 from the right side of the beam 300. The beam 300 is a fourth distance 322 in length.

The hinge 302 prevents moments from being transmitted between the left side of the beam 300 and the right side of the beam 300. The following relationships can be derived via a statics analysis of the left side of the beam in isolation and the right side of the beam in isolation:

$$R_{A1} = -P_{Aa} \quad (1)$$

$$R_{V1} = P_{Va} + P_{Vb}\left(\frac{L-b}{L-h}\right) \quad (2)$$

$$M_1 = (P_{Va})a + P_{Vb}\left(\frac{L-b}{L-h}\right)h \quad (3)$$

$$R_{V2} = P_{Vb}\left(\frac{b-h}{L-h}\right) \quad (4)$$

wherein $R_{A1}$ is the first reactionary load 304, $P_{Aa}$ is the axial load 310, $R_{V1}$ is the second reactionary load 306, $P_{Va}$ is the first vertical load 312, $P_{Vb}$ is the second vertical load 314, L is the fourth distance 322, b is the third distance 320 and h is the second distance 318.

Using the relationships (1)-(4) and static equilibrium analysis, the following equilibrium equations can be derived:

$$\sum F_{Axial} = R_{A1} + P_{Aa} = -P_{Aa} + P_{Aa} = 0 \quad (5)$$

$$\sum F_{vertical} = R_{V1} - P_{Va} - P_{Vb} + R_{V2} = \quad (6)$$
$$P_{Va} + P_{Vb}\left(\frac{L-b}{L-h}\right) - P_{Va} - P_{Vb} + P_{Vb}\left(\frac{b-h}{L-h}\right) = 0$$

$$\sum M = M_1 - (P_{Va})a - (P_{Vb})b + (R_{V2})L = \quad (7)$$
$$(P_{Va})a + P_{Vb}\left(\frac{L-b}{L-h}\right)h - (P_{Va})a - (P_{Vb})b + P_{Vb}\left(\frac{b-h}{L-h}\right)L = 0$$

wherein $\Sigma F_{Axial}$ is the sum of the forces in the axial direction, $\Sigma F_{vertical}$ is the sum of the forces in the vertical direction and $\Sigma M$ is the sum of the moments. The equilibrium equations of Equations (5)-(7), can be evaluated to determine the reactionary loads and reactionary moment. As such, the beam 300 with the internal hinge 302 is statically determinate. Thus, four external restraints (e.g., the first reactionary force 304, the second reactionary force 306, the third reactionary force 309, the reactionary moment 308, etc.) are required to make the beam 300 with the hinge 302 statically determinate. In the illustrated examples of FIGS. 2A and 2B, the external restraints are implemented via the mounts 204A, 204B, 206. As such, the addition of an internal mechanical interface that does not react bending moments (e.g., the spherical bearing 210, etc.) requires the gas turbine engine 200 to be restrained by an additional linkage to be statically determinate and/or stable when compared to an engine (e.g., the gas turbine engine 100 of FIG. 1, etc.) without a mechanical interface.

Figure 4:
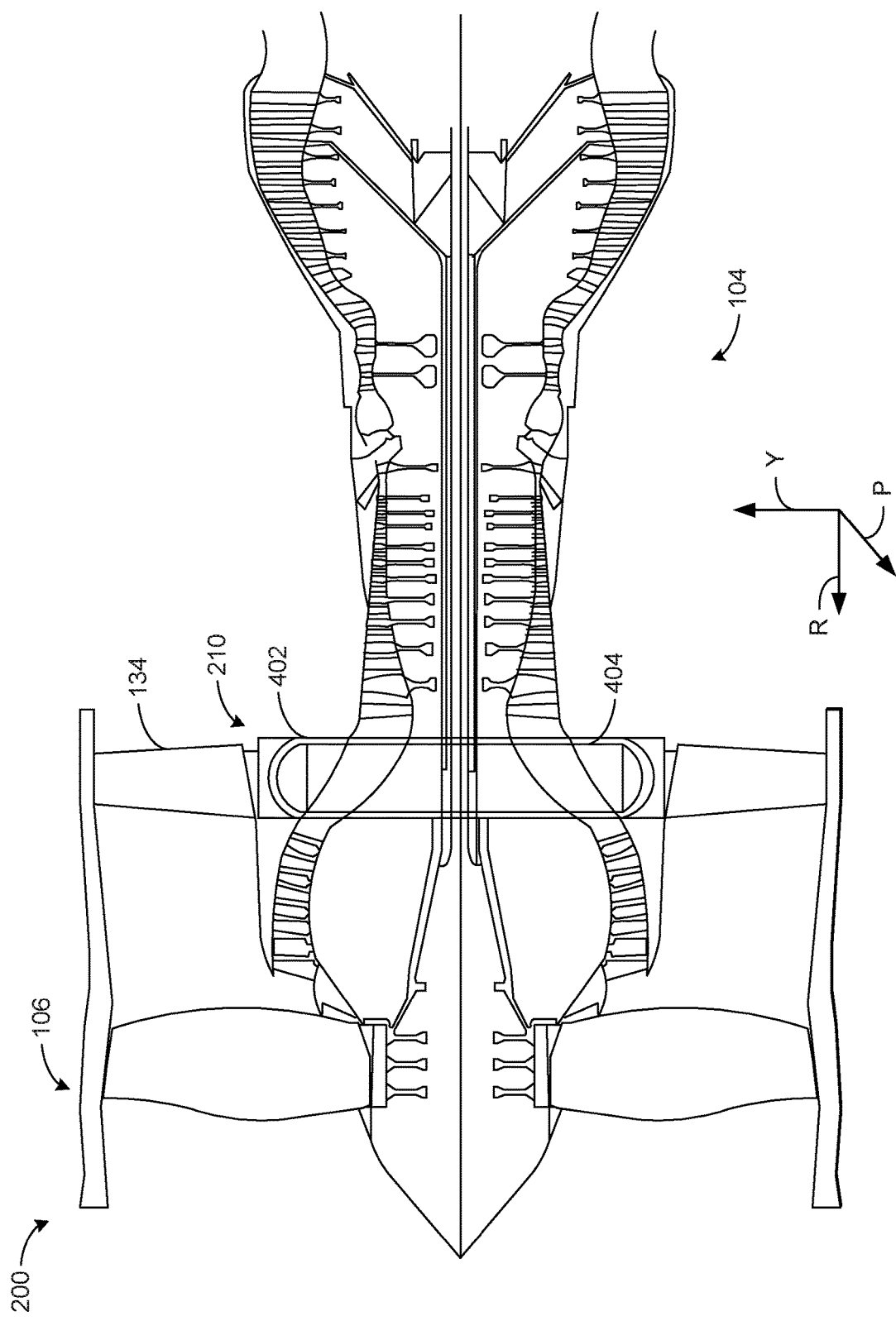
FIG. 4 is a cross-sectional view of a gas turbine engine of FIGS. 2A and 2B depicting a mechanical bearing between a fan section and a core section of the engine.
Figure 5:
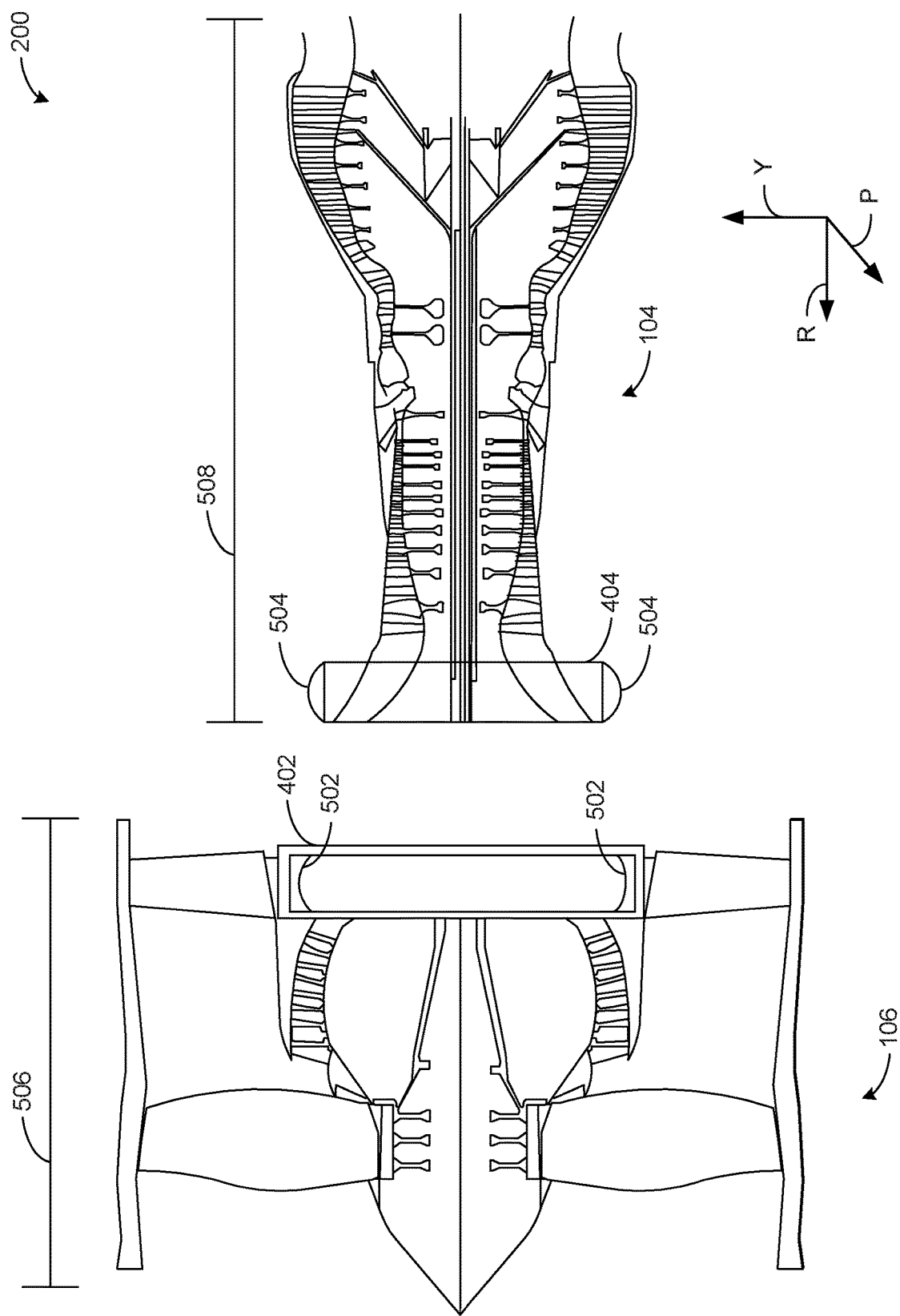
FIG. 5 is a cross-sectional assembly view of the gas turbine engine of FIG. 4.

FIGS. 4 and 5 illustrate examples of the spherical bearing 210 of FIGS. 2A and 2B in greater detail. Particularly, the spherical bearing 210 is a mechanical interface that decouples the fan section 106 from the core section 104 in rotation about the roll axis, pitch axis and yaw axis. The spherical bearing 210 eliminates and/or otherwise reduces the bending moment transmitted between the fan section 106 and the core section 104. As such, the spherical bearing 210 reduces the internal distortions caused by the operation of the gas turbine engine 200 and improves performance thereof.

FIG. 4 is a cross-sectional view of the gas turbine engine 200 of FIGS. 2A-2B depicting the spherical bearing 210 between the fan section 106 and the core section 104. The spherical bearing includes a race 402 and a ball 404. The spherical bearing 210 is disposed under a strut 134 of the gas turbine engine 200. The strut 134 is a structural element of the fan section 106 and/or the gas turbine engine 200. The strut 134 can also serve as a fairing or vane 134.

The race 402 and the ball 404 are components of the spherical bearing 210. The race 402 is associated with the fan section 106, and the ball 404 is associated with the core section 104. In other examples, the race 402 is associated with the turbine 104, and the ball 404 is associated with the fan section 106. The race 402 is disposed about an inner surface of the circumference of the gas turbine engine 200, and the ball 404 is disposed about an outer surface of the circumference of the core section 104, such that race 402 is disposed circumferentially around the ball 404. The race 402 is a groove (e.g., a concave track, etc.) that allows the ball 404 to freely rotate about the race 402. The race 402 and/or the ball 404 can be lubricated or have a layer of a low friction liner disposed thereon (e.g., polytetrafluoroethylene, etc.). As such, the race 402 and ball 404 enable the fan section 106 and the core section 104 to rotate relative to one another.

FIG. 5 is a cross-sectional assembly view of the gas turbine engine 200 of FIG. 2. The cross-sectional view of the gas turbine engine 200 shows the first mating surface 502 of the race 402 and the second mating surface 504 of the ball 404. The gas turbine engine 200 has been divided into a first section 506 corresponding to the fan section 106 and a second section 508 corresponding to the core section 104.

The first mating surface 502 and the second mating surface 504 are the contact elements of the spherical bearing 210 that couple the first section 506 and the second section 508. The first mating surface 502 and the second mating surface 504 are the exterior surfaces of the race 402 and the ball 404, respectively. The mating surfaces 502, 504 extend circumferentially about the center line of the gas turbine engine 200. In FIG. 5, the mating surfaces 502, 504 are continuous (e.g., do not include gaps along the circumference, etc.). In other examples, the mating surfaces 502, 504 include one or more gaps distributed about the circumferences of the mating surfaces 502, 504.

The first section 506 corresponds to the fan section 106 of the gas turbine engine 200, and the second section 508 corresponds to the core section 104 of the gas turbine engine 200. In other examples, the sections correspond to other discrete section(s) of the gas turbine engine 200. For example, the first section 506 can correspond to the fan section 106 and the HP compressor 114, and the second section 508 can correspond to the combustion section 116, the HP turbine 118 and the LP turbine 120. The mating surfaces 502, 504 of the spherical bearing 210 enable the first section 506 to rotate relative to the second section 508.

FIGS. 6-11B illustrate example implementations of pinned joints to prevent bending moments about one or more axes from being transmitted between sections of a gas turbine. In FIGS. 6-11B, the orientation of features is described with reference to clock positions. In these examples, the clock positions are described in reference to the position of the features in a plane defined by the yaw axis and pitch axis (the Yaw-Pitch plane), wherein the 12 o'clock position is oriented along the yaw-axis. In FIGS. 6-11B, locations of pins are described with respect to an orientation of a central axis of the pin. For example, if a pin is located at the 12 o'clock position, the pin's central axis extends radially outward towards the 12 o'clock position. As such, pins located at the 12 o'clock and 6 o'clock positions have central axes disposed parallel to the yaw axis and pins located at the 3 o'clock and 9 o'clock positions have central axes disposed along the pitch axis.

Figure 6:
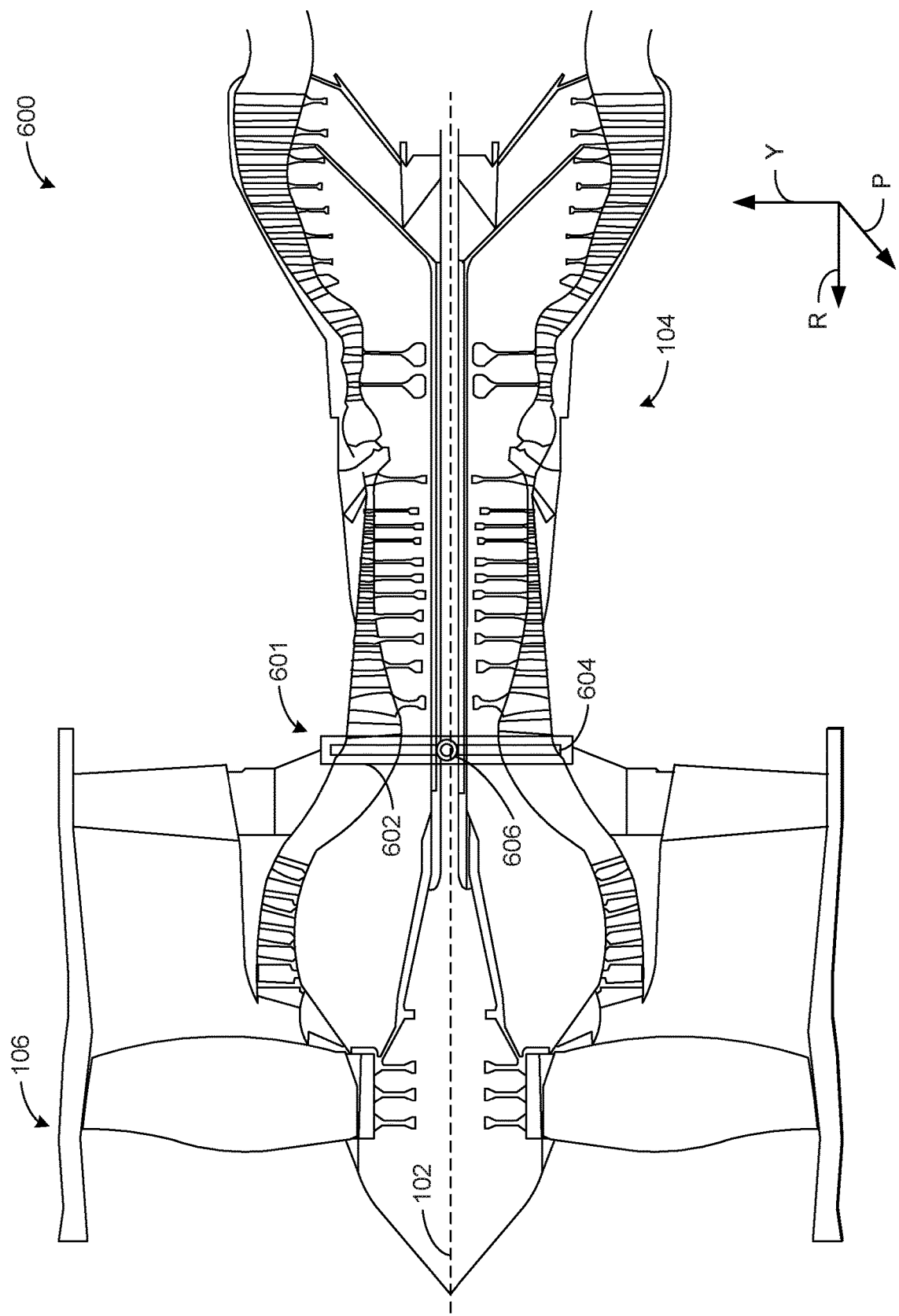
FIG. 6 is a cross-sectional view of another example gas turbine engine that has a pinned joint between a fan section and core section of the gas turbine engine.

FIG. 6 is a cross-sectional view of a gas turbine engine 600 depicting a pinned joint 601 between the fan section 106 and the core section 104. The example pinned joint 601 includes a first flange 602, a second flange 604 and pin(s) 606.

The pinned joint 601 is a mechanical interface disposed between the fan section 106 and the core section 104. In other examples, the pinned joint 601 is disposed between any other components and/or sections of the gas turbine engine 600. The pinned joint 601 reacts axial loads, lateral loads, and vertical loads transmitted between the fan section 106 and the core section 104. The pinned joint 601 does not react bending moments oriented along an axis defined by the pins 606 (e.g., moments about the yaw axis, moments about the pitch axis, etc.) transmitted between the fan section 106 and the core section 104. That is, the pinned joint 601 enables the fan section 106 to rotate relative to the core section 104. In FIG. 6, the pins 606 of the pinned joint 601 are oriented along the pitch axis, which enables unrestrained rotation of the fan section 106 relative to the core section 104 about the pitch axis. Alternatively, the pins 606 can be oriented along another axis (e.g., the yaw axis, etc.) which enables unrestrained rotation of the fan section 106 relative to the core section 104 about that axis.

The first flange 602 includes a mating surface associated with the fan section 106. The first flange 602 is disposed circumferentially about the center line of the gas turbine engine 600 on the fan section 106. The second flange 604 includes a mating surface associated with the core section 104. The second flange 604 is disposed circumferentially about the center line of the gas turbine engine 600 on the HP compressor 114. Either or both of the flanges 602, 604 can have a liner (e.g., a polytetrafluoroethylene (PTFE) liner, etc.) to reduce fiction. Additionally or alternatively, the coupling of the flanges 602, 604 can be lubricated. An internal surface of the first flange 602 is mated to an external surface of the second flange 604 via the pins 606 (e.g., the second flange 604 is nested within the first flange 602, etc.), such that the first flange 602 is disposed circumferentially around the second flange 604. In other examples, an internal surface of the first flange 602 is mated to an external surface of the second flange 604 (e.g., the first flange 602 is nested within the second flange 604, etc.), such that the second flange 604 is disposed circumferentially around the first flange 602.

The example pin(s) 606 couple the flanges 602, 604 together. In FIG. 6, the pinned joint 601 includes two pins coupled colinearly along the pitch axis of the gas turbine engine 600 (e.g., at the 3 o'clock and the 9 o'clock positions of the engine 600). In other examples, the pin(s) of the pinned joint 601 can be located in another position (e.g., colinearly along the yaw axis, etc.). The pin(s) 606 extend radially outward from an external surface of the second flange 604 through an opening(s) in the first flange 602. In other examples, the example pin(s) 606 extend radially inward from an internal surface of the first flange 602 into an opening of the second flange 604. The pin(s) 606 are evenly distributed about the axial centerline axis 102 of the gas turbine engine 600. In other examples, the pin(s) 606 can be distributed differently (e.g., at the 2 o'clock and the 10 o'clock positions of the engine 600, etc.). Thus, the pin(s) 606 of the pinned joint 601 react translational loads between flanges 602, 604 and enable relative rotation thereof. The location of the pins 606 (e.g., at the 3 o'clock and 9 o'clock positions, or at the 6 o'clock and 12 o'clock positions, etc.) defines the axis of free-rotation. Thus, if the pins are located at the 3 o'clock and 9 o'clock positions (as shown in FIG. 6) there is free rotation of the fan section 106 relative to the core section 104 about the pitch axis. Similarly, if the pins are located at the 12 o'clock and 6 o'clock positions there would be free rotation of the fan section 106 relative to the core section 104 about the yaw axis.

Figure 7:
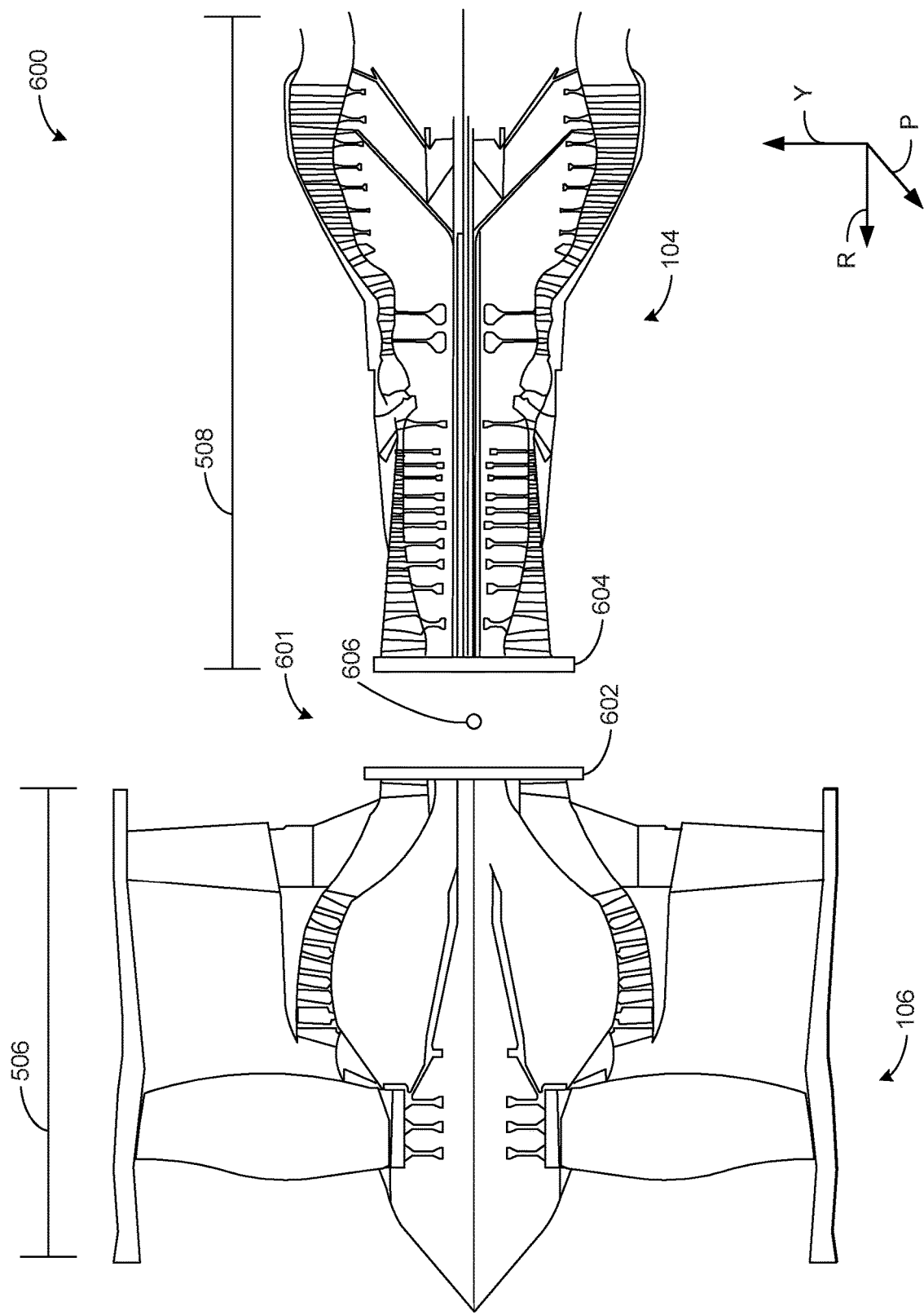
FIG. 7 is a cross-sectional assembly view of the gas turbine engine of FIG. 6.

FIG. 7 is a cross-sectional assembly view of the gas turbine engine 600 including the pinned joint 601 of FIG. 6. The cross-sectional view of the gas turbine engine 600 shows the first flange 602 of the pinned joint 601 and the second flange 604 of the pinned joint 601. The gas turbine engine 600 has been divided into the first section 506 of FIG. 5 corresponding to the fan section 106 and the second section 508 of FIG. 5 corresponding to the core section 104.

The flanges 602, 604 extend circumferentially about the center line of the gas turbine engine 600. In FIG. 6, the flanges 602, 604 are continuous (e.g., do not include gaps along the circumference, etc.). In other examples, the flanges 602, 604 include one or more gaps distributed about the circumference of the flanges 602, 604.

FIGS. 8A and 8B are simplified illustrations of the pinned joint 601 of FIGS. 6 and 7. FIG. 8A illustrates the flanges 602, 604 prior to being coupled together. The first flange 602 includes a first opening 802A and a second opening 802B. The second flange 604 includes a first pin 804A and a second pin 804B (not illustrated), which correspond to the pin(s) 606 of FIG. 6.

The first flange 602 has an internal diameter slightly larger than the external diameter of the second flange 604 such that second flange 604 fits within, and couples to the first flange 602. In other examples, the first flange 602 can have an external diameter slightly smaller than the internal diameter of the second flange 604 such that the first flange 602 fits within and couples the second flange 604.

The pins 804A, 804B extend radially out from the second flange 604. In FIG. 6, the pins 804A, 804B are substantially colinear. Additionally or alternatively, the second flange 604 and/or the first flange 602 can include other pins in addition to the pins 804A, 804B. An example including four pins is described below in connection with FIGS. 9-11A. The pins 804A, 804B can be coupled to the second flange 604 via a weld or any other suitable coupling (e.g., press fit, threaded connection, fasteners, etc.). In some examples, the pins 804A, 804B are coupled to the first flange 602 and extend radially inward. In such examples, the second flange 604 includes corresponding openings to receive the pins 804A, 804B.

The first flange 602 includes openings 802A, 802B corresponding to the pins 804A, 804B, respectively. The shape of the openings 802A, 802B corresponds to the shape of the pins 804A, 804B. In FIGS. 8A and 8B, the openings 802A, 802B and the pins 804A, 804B have a circular cross-section.

The first flange 602 and the second flange 604 have been coupled into the pinned joint 601 via the pins 804A, 804B. The second flange 604 is coupled concentrically within the first flange 602. The pins 804A, 804B have been inserted into the openings 802A, 802B.

Figure 9:
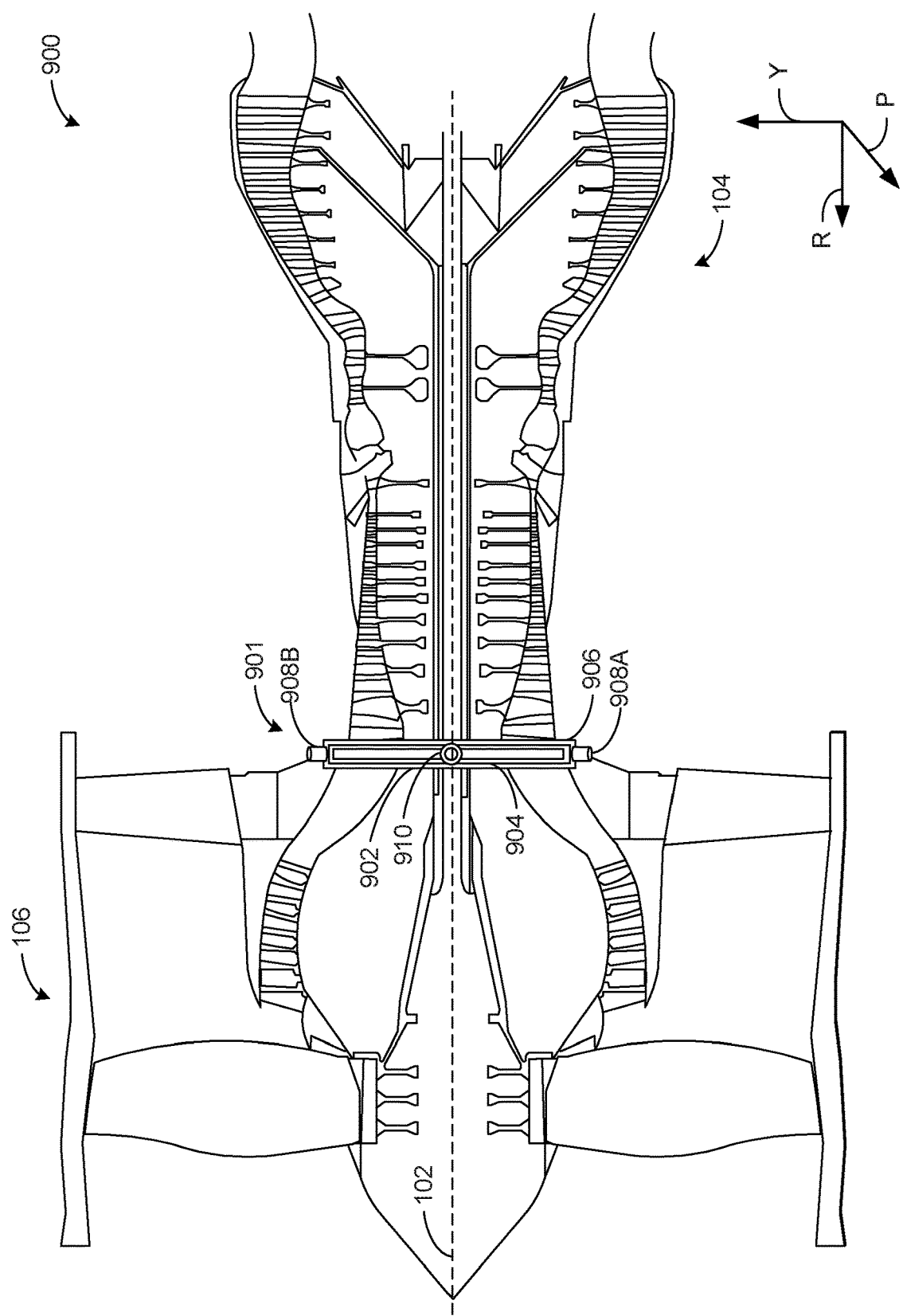
FIG. 9 is a cross-sectional view of another gas turbine engine that has an alternative pinned joint between a fan section and a core section of the engine.

FIG. 9 is a cross-sectional view of a gas turbine engine 900 depicting an alternative pinned joint 901 between the fan section 106 and the core section 104. The pinned joint 901 includes a first flange 902, a second flange 904, and a third flange 906. First pins 908A, 908B couple the first flange 902 to the second flange 904 and second pin(s) 910 couple the second flange 904 to the third flange 906. In FIG. 9, the first pins 908A, 908B are not in contact with the third flange 906 and the second pins 910 are not in contact with the first flange 902 such that first flange 902 and the third flange 906 are able to rotate relative to each other about the pitch and yaw axes.

The pinned joint 901 is a mechanical interface disposed between the fan section 106 and the core section 104. In other examples, the pinned joint 901 is disposed between any other components and/or sections of the gas turbine engine 900. In some examples, the pinned joint 901 reacts vertical, lateral, and axial loads transmitted between the fan section 106 and the core section 104. In some examples, the pinned joint 901 does not react bending moments (e.g., moments about the yaw axis, moments about the pitch axis, etc.) transmitted between the fan section 106 and the core section 104. That is, the pinned joint 901 enables the fan section 106 to rotate about the core section 104.

The first flange 902 includes a mating surface associated with the fan section 106. The first flange 902 includes a mating surface associated with the fan section 106. The third flange 906 includes a mating surface associated with the core section 104. In some examples, the third flange 906 is a ring. The second flange 904 is an intermediate mating surface between the first flange 902 and the third flange 906. The flanges 902, 904, 906 are disposed circumferentially about the center line of the gas turbine engine 900 on the fan section 106. In some examples, some or all of the flanges 902, 904, 906 have a liner (e.g., a PTFE liner, etc.) to reduce fiction. Additionally or alternatively, the coupling of the first flange 902 and the second flange 904 and/or the coupling of the second flange 904 and the third flange 906 can be lubricated. An internal surface of the first flange 902 is mated to an external surface of the second flange 904 via the first pin(s) 908A, 908B (e.g., the second flange 904 is nested within the first flange 902, etc.) and an internal surface of the second flange 904 is mated to an external surface of the third flange 906, such that the first flange 902 is disposed circumferentially around the second flange 904 and the third flange 906. In other examples, the arrangement of the flanges 902, 904, 906 is reversed such that an external surface of the first flange 902 is mated to an internal surface of the second flange 904 via the first pin(s) 908A, 908B (e.g., the first flange 902 is nested within the second flange 904, etc.), and an external surface of the second flange 904 is mated to an internal surface of the third flange 906 via the second pin(s) 910, such that the third flange 906 is disposed circumferentially around the first flange 902 and the second flange 904.

The first pins 908A, 908B couple the first flange 902 to the second flange 904. The first pins 908A, 908B include two pins coupled colinearly along the yaw axis of the gas turbine engine 900 (e.g., at the 12 o'clock and 6 o'clock positions of the engine 900, etc.). In other examples, the positions of the pins 908A, 908B are exchanged with the positions of the second pin(s) 910. In FIG. 9, the pins 908A, 908B do not directly couple the first flange 902 to the third flange 906 to prevent bending moments from being transmitted between the fan section 106 and the core section 104. In the example of FIG. 9, the orientation of the first pins 908A, 908B enable the first flange 902 to rotate relative to the second flange 904 about the yaw axis.

The second pin(s) 910 couple the second flange 904 to the third flange 906. The second pin(s) 910 includes two pins coupled colinearly along the pitch axis of the gas turbine engine 900 (e.g., at the 9 o'clock and 3 o'clock positions of the engine 900, etc.). In other examples, the pin(s) 910 can be at another location (e.g., colinearly along the yaw axis, etc.). The second pin(s) 910 do not directly couple the first flange 902 to the third flange 906 to prevent bending moments from being transmitted between the fan section 106 and the core section 104. The pins 908A, 908B, 910 are evenly distributed about the axial centerline axis 102 of the gas turbine engine 900. In the example of FIG. 9, the orientation of the second pins 910 enable the second flange 904 to rotate relative to the third flange 906 about the pitch axis. As such, the pinned joint 901 allows the first flange 902 to rotate relative to the third flange 906 along the yaw axis, due to the first pins 908A, 908B, and along the pitch axis, due to the second pins 910.

Figure 10:
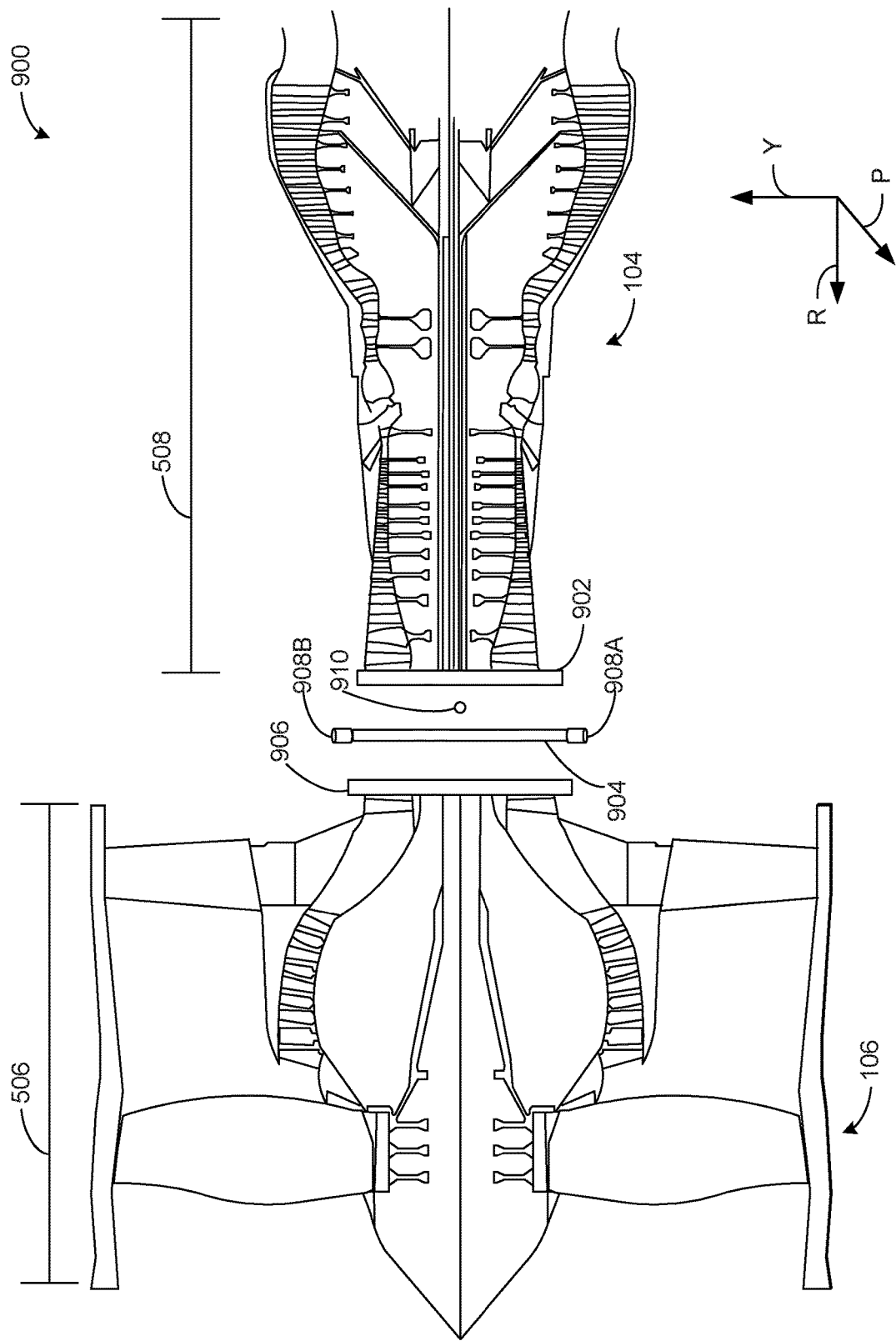
FIG. 10 is a cross-sectional assembly view of the gas turbine engine of FIG. 9.

FIG. 10 is a cross-sectional assembly view of the gas turbine engine 900 including the pinned joint 901 of FIG. 9. The gas turbine engine 900 has been divided into the first section 506 of FIG. 5 corresponding to the fan section 106 and the second section 508 of FIG. 5 corresponding to the core section 104.

The flanges 902, 904, 906 extend circumferentially about the center line of the gas turbine engine 900. In some examples, the flanges 902, 904, 906 are continuous (e.g., do not include gaps along the circumference, etc.). In other examples, the flanges 902, 904, 906 include one or more gaps distributed about the circumference of the flanges 902, 904, 906.

FIGS. 11A-11B are simplified illustrations of the pinned joint 901 of FIGS. 9 and 10. FIG. 11A illustrates the first flange 902 prior to being coupled to an assembly 1100. The assembly 1100 includes the second flange 904, the third flange 906, the first pins 908A, 908B and the second pin(s) 910. In some examples, the second pin(s) 910 include a third pin 1102 (not illustrated). The second flange 904 includes example first opening(s) 1104. The first flange 902 includes a first opening 1106A and a second opening 1106B.

The assembly 1100 can be assembled by coupling the first flange 902 to the second flange 904 via the first pins 908A, 908B. The assembly 1100 can be assembled as described above with respect to the assembly of pinned joint 601 of FIG. 6B, for example. The assembly 1100 can be assembled by inserting the second pin(s) 910 through the first opening(s) 1104. The first opening(s) 1104 are shaped to be consistent with the second pin(s) 910. The first pins 908A, 908B extend radially out from the second flange 904 and do not couple the second flange 904 to the third flange 906.

The first flange 902 has an internal diameter slightly larger than the external diameter of the second flange 904 such that second flange can be coupled within the first flange 902. Similarly, the second flange 904 has an internal diameter slightly larger than the external diameter of the third flange 906. In other examples, the flanges 902, 904, 906 can have a different configuration. For example, the first flange 902 can have an external diameter slightly small than the internal diameter of second flange 904 such that the first flange 902 can be coupled inside the second flange 904. Similarly, the second flange 904 has an external diameter slightly smaller than the internal diameter of the third flange 906.

The first pins 908A, 908B extend radially out from the third flange 906. The first pins 908A, 908B are colinear. In some examples, the first pins 908A, 908B are coupled to the second flange 904 via a weld. In other examples, the pins 908A, 908B are coupled to the second flange 604 via any other suitable coupling (e.g., press fit, threaded connections, fasteners, etc.). In some examples, the first pins 908A, 908B are coupled to the first flange 902 and extend radially inward. In such examples, the second flange 904 can include corresponding openings to receive the first pins 908A, 908B.

The second pin(s) 910 extend radially out from the third flange 906. The second pin(s) 910 are substantially colinear. In some examples, the second pin(s) 910 are coupled to the third flange 906 via a weld. In other examples, the second pin(s) 910 are coupled to the third flange 906 via any other suitable means (e.g., press fit, threaded connection, fasteners, etc.). In some examples, the second pin(s) 910 are coupled to the second flange 904 and extend radially inward. In such examples, the third flange 906 can include corresponding openings to receive the second pin(s) 910.

In some examples, the shape of the second openings 1106A, 1106B corresponds to the shape of the first pins 908A, 908B. In FIGS. 11A and 11B, the second openings 1106A, 1106B and the first pins 908A, 908B have a circular cross-section.

In FIG. 11B, the first flange 902 and the assembly 1100 are coupled together to form the pinned joint 901 via the pins 908A, 908B, 910. The first flange 902 is coupled concentrically with the second flange 904, and the first pins 908A, 908B are inserted into the second openings 1106A, 1106B.

In FIGS. 9-11B, the pinned joint 901 is illustrated as a single interface between the fan section 106 and the core section 104. Additionally or alternatively, the pinned joint 901 can be implemented as a plurality of interfaces. The pinned joint 901 can be implemented as a first interface coupling a first section of the engine 900 (e.g., the fan section 106, etc.) to a second section of the engine 900 (e.g., the core section 104, etc.) and a second interface a third section of the engine 900 (e.g., the compressor, etc.) to a fourth section of the engine 900 (e.g., the combustion section 116, etc.). In such examples, the first interface constrains the lateral and axial degrees-of-freedom (e.g., via the first pins 908A, 908B, etc.), and the second interface releases a vertical degree-of-freedom (e.g., via the second pin(s) 910, etc.). In some examples, the second interface is implemented in the mid-flange of an engine component (e.g., a mid-flange of the fan section 106, a mid-flange of the compressor 114, a mid-flange of the combustion section 116, a mid-flange of the HP turbine 118, a mid-flange of the second turbine 120, etc.).

The examples disclosed herein increase gas turbine efficiency (e.g., specific fuel consumption, etc.) by enabling closer blade tip clearance in the rotors of the engine. In some examples, a pinned joint and/or spherical bearing prevents bending moments from being transmitted internal between sections of a gas turbine which reduces the distortions, strain and/or bending caused by gas turbine operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A mechanical interface to couple a first section of a gas turbine to a second section of the gas turbine, the mechanical interface comprising a first mating surface disposed on the first section and a second mating surface disposed on the second section and the first mating surface, wherein the coupling of the first mating surface to the second mating surface enables the first section to rotate about the mechanical interface during operation of the gas turbine.

2. The mechanical interface of any preceding clause, wherein the mechanical interface is a spherical bearing, the first mating surface is a ball of the spherical bearing, and the second mating surface is a race of the spherical bearing.

3. The mechanical interface of any preceding clause, wherein the mechanical interface is a pinned joint, the first mating surface is a first mating flange, and the second mating surface is a second mating flange, the mechanical interface further including a first pin coupling the first mating flange to the second mating flange, and a second pin coupling the first mating flange to the second mating flange, the second pin disposed at location substantially colinear to the first pin.

4. The mechanical interface of any preceding clause, further including a ring disposed between the first mating flange and the second mating flange, the first pin extending from the first mating flange through the ring, the second pin extending from the first mating flange through the ring, a third pin extending from the ring through the second mating flange, and a fourth pin extending from the ring through the second mating flange.

5. The mechanical interface of any preceding clause, wherein the third pin is oriented substantially perpendicularly to the first pin and the third pin is oriented substantially linearly to the fourth pin.

6. The mechanical interface of any preceding clause, wherein the first section is a fan section and the second section is a core section.

7. The mechanical interface of any preceding clause, wherein the mechanical interface enables vertical, axial, and lateral loads to be transmitted between the first section and the second section.

8. A gas turbine engine, comprising a first section including a fan section, a second section including at least one of a high pressure compressor, a low pressure turbine, or a high pressure turbine and a mechanical interface between the first section and the second section, the mechanical interface enabling the first section to rotate about the second section while retaining the gas turbine engine to a vehicle mount during operation of the engine.

9. The gas turbine of any preceding clause, wherein the first section is coupled to an aircraft via a forward mount, the forward mount including a first set of linkages at a first location of the first section, the first set of linkages restraining motion of the first section about the aircraft in an axial direction, a lateral direction, a vertical direction, a yaw axis, and a roll axis and a thrust linkage at a second location of the first section, the thrust linkage preventing rotation of the first section about the first location.

10. The gas turbine of any preceding clause, wherein the second section is coupled to the aircraft via an aft mount including a second set of linkages at a third location of the second section, the second set of linkages restraining motion of the second section about the aircraft in the axial direction, the lateral direction, and the vertical direction.

11. The gas turbine of any preceding clause, wherein the mechanical interface restrains motion of the second section relative to the first section in the axial direction, the lateral direction, and the vertical direction.

12. The gas turbine of any preceding clause, wherein the mechanical interface is a spherical bearing, the spherical bearing including a race disposed radially about the first section and a ball disposed radially about the first section.

13. The gas turbine of any preceding clause, wherein the mechanical interface is a pinned joint, the pinned joint including a first mating surface disposed radially about the first section and a second mating surface disposed radially about the second section, the first mating surface and the second mating surface joined via a plurality of pins.

14. The gas turbine of any preceding clause, wherein the plurality of pins is evenly distributed about a central axis of the gas turbine.

15. The gas turbine of any preceding clause, further including a ring disposed between the first mating surface and the second mating surface.

16. The gas turbine of any preceding clause, wherein a first one of the plurality of pins couples the first mating surface to the ring and a second one of the plurality of pins couples the second mating surface to the ring.

17. An apparatus comprising a gas turbine engine having a first section and a second section and means for coupling the first section to the second section, the coupling means enabling the first section to rotate about the second section and retain the engine to a vehicle mount during operation of the gas turbine engine.

18. The apparatus of any preceding clause, wherein the first section is coupled to an aircraft via a forward mount, the forward mount including a first set of linkages at a first location of the first section, the first set of linkages restraining motion of the first section relative to the aircraft in an axial direction, a lateral direction, a vertical direction, a yaw axis, and a roll axis and a thrust linkage at a second location of the first section, the thrust linkage preventing rotation of the first section about the first location.

19. The apparatus of any preceding clause, wherein the second section is coupled to the aircraft via an aft mount including a second set of linkages at a third location of the second section, the second set of linkages restraining motion of the second section relative to the aircraft in the axial direction, the lateral direction, and the vertical direction.

20. The apparatus of any preceding clause, wherein the coupling means restrains motion of the second section relative to the first section in the axial direction, the lateral direction, and the vertical direction.

21. The apparatus of any preceding clause, wherein the mount is a fuselage, tail or wing mount.

22. The apparatus of any preceding clause, wherein the mount is a wing mount and the wing mount is a pylon such that the engine is mounted beneath the wing.

23. The apparatus of any preceding clause, wherein the engine is an open rotor gas turbine engine.

24. The apparatus of any preceding clause, wherein the first set of linkages includes at least one of three linkages, a 2-pin swing linkage and a 3-pin fixed linkage.

25. The apparatus of any preceding clause, wherein the second set of linkages includes at least one of three linkages, a 2-pin swing linkage and a 3-pin fixed linkage. The following claims are hereby incorporated into this Detailed Description by this reference, with each claim standing on its own as a separate embodiment of the present disclosure.

What is claimed is:

1. A pinned joint to couple a first section of a gas turbine to a second section of the gas turbine, the pinned joint comprising:
   a first mating surface disposed radially about the first section;
   a second mating surface disposed radially about the second section and circumferentially around the first mating surface, the first mating surface and the second mating surface joined via a plurality of pins, wherein the coupling of the first mating surface to the second mating surface enables the first section to rotate about the pinned joint during operation of the gas turbine,
   a ring disposed between the first mating surface and the second mating surface;
   a first pin coupling the first mating surface to the ring; and
   a second pin coupling the second mating surface to the ring.

2. The pinned joint of claim 1, wherein the first mating surface is a first mating flange, and the second mating surface is a second mating flange,
   the first pin coupling the first mating flange to the second mating flange; and
   the second pin coupling the first mating flange to the second mating flange, the second pin disposed at a location substantially colinear to the first pin.

3. The pinned joint of claim 2, wherein the ring is disposed between the first mating flange and the second mating flange, the first pin extending from the first mating flange through the ring, the second pin extending from the first mating flange through the ring;
   a third pin extending from the ring through the second mating flange; and
   a fourth pin extending from the ring through the second mating flange.

4. The pinned joint of claim 3, wherein the third pin is oriented substantially perpendicularly to the first pin and the third pin is oriented substantially linearly to the fourth pin.

5. The pinned joint of claim 1, wherein the first section is a fan section and the second section is a core section.

6. The pinned joint of claim 1, wherein the pinned joint enables vertical, axial and lateral loads to be transmitted between the first section and the second section.

7. A gas turbine engine, comprising:
   a first section including a fan section;
   a second section including at least one of a high pressure compressor, a low pressure turbine, or a high pressure turbine; and
   a pinned joint, the pinned joint including a first mating surface disposed radially about the first section and a second mating surface disposed radially about the second section, the first mating surface and the second mating surface joined via a plurality of pins, between the first section and the second section, the pinned joint enabling the first section to rotate about the second section while retaining the gas turbine engine to a vehicle mount during operation of the engine,
   a ring disposed between the first mating surface and the second mating surface;
   a first one of the plurality of pins coupling the first mating surface to the ring; and
   a second one of the plurality of pins coupling the second mating surface to the ring.

8. The gas turbine of claim 7, wherein the first section is coupled to an aircraft via a forward mount, the forward mount including:
   a first set of linkages at a first location of the first section, the first set of linkages restraining motion of the first section about the aircraft in an axial direction, a lateral direction, a vertical direction, a yaw axis, and a roll axis; and
   a thrust linkage at a second location of the first section, the thrust linkage preventing rotation of the first section about the first location.

9. The gas turbine of claim 8, wherein the second section is coupled to the aircraft via an aft mount including a second set of linkages at a third location of the second section, the second set of linkages restraining motion of the second section about the aircraft in the axial direction, the lateral direction, and the vertical direction.

10. The gas turbine of claim 9, wherein the pinned joint restrains motion of the second section relative to the first section in the axial direction, the lateral direction, and the vertical direction.

11. The gas turbine of claim 7, wherein the plurality of pins is evenly distributed about a central axis of the gas turbine.

12. An apparatus comprising:
a gas turbine engine having a first section and a second section;
means for coupling the first section to the second section, the means for coupling enabling the first section to rotate about the second section and retain the engine to a vehicle mount during operation of the gas turbine engine, the means for coupling including a pinned joint that includes a first mating surface disposed radially around the first section and a second mating surfaced disposed radially about the second section, the first mating surface and the second mating surface joined via a plurality of means for pinning;
a ring disposed between the first mating surface and the second mating surface;
a first one of the means for pinning, to couple the first mating surface to the ring; and
a second one of the means for pinning, to couple the second mating surface to the ring.

13. The apparatus of claim 12, wherein the first section is coupled to an aircraft via a forward mount, the forward mount including:

a first set of linkages at a first location of the first section, the first set of linkages restraining motion of the first section relative to the aircraft in an axial direction, a lateral direction, a vertical direction, a yaw axis, and a roll axis; and a thrust linkage at a second location of the first section, the thrust linkage preventing rotation of the first section about the first location.

14. The apparatus of claim 13, wherein the second section is coupled to the aircraft via an aft mount including a second set of linkages at a third location of the second section, the second set of linkages restraining motion of the second section relative to the aircraft in the axial direction, the lateral direction, and the vertical direction.

15. The apparatus of claim 14, wherein the means for coupling restrains motion of the second section relative to the first section in the axial direction, the lateral direction, and the vertical direction.

* * * * *